(12) United States Patent
Molina (10) Patent No.: US 12,396,508 B2
(45) Date of Patent: Aug. 26, 2025

(54) SUSPENSION ASSEMBLY AND METHOD OF MANUFACTURE

(71) Applicant: Honeywell Safety Products USA, Inc., Charlotte, NC (US)

(72) Inventor: Domingo Llanos Molina, Mexico City (MX)

(*) Notice: Subject to any disclaimer, the term of this patent is extended or adjusted under 35 U.S.C. 154(b) by 26 days.

(21) Appl. No.: 18/319,924

(22) Filed: May 18, 2023

(65) Prior Publication Data

US 2024/0381967 A1     Nov. 21, 2024

(51) Int. Cl.
A42B 3/14      (2006.01)
A42B 3/12      (2006.01)
B29C 45/00     (2006.01)
B29L 31/48     (2006.01)

(52) U.S. Cl.
CPC ............ *A42B 3/14* (2013.01); *A42B 3/125* (2013.01); *B29C 45/0001* (2013.01); *B29K 2995/0068* (2013.01); *B29L 2031/4821* (2013.01)

(58) Field of Classification Search
CPC ......... A42B 3/14; A42B 3/142; A42B 3/145; A42B 3/147; A42B 3/08; A42B 3/085; A42B 3/324; A42B 3/125
See application file for complete search history.

(56) References Cited

U.S. PATENT DOCUMENTS

| | | | | |
|---|---|---|---|---|
| 3,354,468 A | * | 11/1967 | Bowers, Jr. | A42B 3/142 2/421 |
| 3,430,260 A | * | 3/1969 | Stropkay | A42B 3/14 2/416 |
| 5,121,508 A | * | 6/1992 | Grilliot | A42B 3/08 2/5 |
| 5,608,917 A | | 3/1997 | Landis et al. | |
| 7,213,271 B1 | | 5/2007 | Bielefeld | |
| 10,549,502 B2 | | 2/2020 | Berrang | |
| 2005/0138719 A1 | | 6/2005 | Huh | |
| 2006/0048285 A1 | | 3/2006 | Bielefeld et al. | |

(Continued)

OTHER PUBLICATIONS

F & F Industrial, "MSA 454231 Skullgard Cap or Hat Replacement Suspension, Staz-On", retrieved from the Internet at URL: <https://fandfind.com/product/msa-454231-skullgard-cap-or-hat-replacement-suspension-staz-on/> on Nov. 6, 2013, 1 page.

(Continued)

*Primary Examiner* — Khoa D Huynh
*Assistant Examiner* — Erick I Lopez
(74) *Attorney, Agent, or Firm* — Fredrikson & Byron, P.A.

(57) ABSTRACT

Methods, assemblies, and/or the like are provided. In accordance with various embodiments of the present disclosure there is provided a suspension assembly including a suspension frame having a lower band including one or more band holes configured to provide ventilation to a wearer of the suspension frame; and an upper band having one or more slots; and a pad overmolded onto the suspension frame, wherein the pad has one or more pad holes, wherein the one or more pad holes are configured to be aligned with the one or more slots such that the one or more pad holes are configured to provide ventilation to the wearer of the suspension frame. In some embodiments, the pad is overmolded onto the upper band of the suspension frame. In some embodiments, the suspension frame is a single piece including the lower band and the upper band.

6 Claims, 9 Drawing Sheets

(56) References Cited

U.S. PATENT DOCUMENTS

| | | | |
|---|---|---|---|
| 2015/0000370 A1 | 1/2015 | Crossman et al. | |
| 2015/0059057 A1 | 3/2015 | Pfanner et al. | |
| 2016/0016342 A1 | 1/2016 | Al-Dahhan et al. | |
| 2016/0262484 A1 | 9/2016 | Huh | |
| 2017/0150770 A1* | 6/2017 | Huh | A42B 3/085 |
| 2017/0245577 A1 | 8/2017 | Zhang et al. | |
| 2020/0390182 A1* | 12/2020 | Huh | A42B 3/142 |
| 2022/0210560 A1 | 6/2022 | Lin et al. | |

OTHER PUBLICATIONS

Extended European Search Report Mailed on Oct. 18, 2024 for EP Application No. 24173655, 8 page(s).

\* cited by examiner

SUSPENSION ASSEMBLY AND METHOD OF MANUFACTURE

TECHNICAL FIELD

The present disclosure relates generally to suspension assemblies. In particular, it relates to suspension assemblies with an overmolded pad for use with hard hats of helmets.

BACKGROUND

Suspension assemblies may be inserted or otherwise attached to the inside of hard hats and helmets to create a better and more comfortable fit when worn by a user. Suspension assemblies often require multiple parts, including the frame itself and a pad or other "soft" material to make the assembly comfortable for the user and wearable for longer periods of time. The requirement of multiple parts leads to more expensive design and development, though, for suspension assemblies.

Through applied effort, ingenuity, and innovation, Applicant has solved problems relating to suspension assemblies by developing solutions embodied in the present disclosure, which are described in detail below.

SUMMARY

In general, embodiments of the present disclosure provide assemblies, methods of manufacture, and/or the like.

In accordance with various embodiments of the present disclosure there is provided a suspension assembly including a suspension frame having a lower band including one or more band holes configured to provide ventilation to a wearer of the suspension frame; and an upper band having one or more slots; and a pad overmolded onto the suspension frame, wherein the pad has one or more pad holes, wherein the one or more pad holes are configured to be aligned with the one or more slots such that the one or more pad holes are configured to provide ventilation to the wearer of the suspension frame.

In some embodiments, the pad is overmolded onto the upper band of the suspension frame.

In some embodiments, the suspension frame is a single piece including the lower band and the upper band.

In some embodiments, the suspension frame includes one or more flanges having one or more flange connection slots, wherein the one or more flange connection slots are configured to receive one or more fasteners to attach the suspension assembly to a helmet.

In some embodiments, the suspension frame is composed of high-density polyethylene or polyamide 6.

In some embodiments, the pad is a sweatband having moisture-wicking properties and composed of a thermoplastic elastomer (TPE), thermoplastic vulcanizates (TPV), or Thermoplastic Poly Urethane (TPU).

In some embodiments, the suspension assembly includes a helmet fixedly attached to the suspension frame.

In some embodiments, the helmet is a hardhat.

According to various embodiments, there is provided a method of manufacturing a suspension assembly, the method including injecting, by a first injection unit, a first material onto a mold defining a suspension frame, wherein the suspension frame includes: a lower band having one or more band holes configured to provide ventilation to a wearer of the suspension frame; and an upper band including one or more slots; rotating the mold; and injecting, by a second injection unit, a second material onto the suspension frame such that the second material forms a pad overmolded on the suspension frame.

In some embodiments, the pad is overmolded onto the upper band of the suspension frame.

In some embodiments, the suspension frame is a single piece having the lower band and the upper band.

In some embodiments, the suspension frame includes one or more flanges having one or more flange connection slots, wherein the one or more flange connection slots are configured to receive one or more fasteners to attach the suspension assembly to a helmet.

In some embodiments, the first material is composed of high-density polyethylene or polyamide 6.

In some embodiments, the pad is a sweatband having moisture-wicking properties.

In some embodiments, the second material is composed of thermoplastic elastomer (TPE), thermoplastic vulcanizates (TPV), or Thermoplastic Poly Urethane (TPU).

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, a suspension assembly includes a suspension frame and a pad. In some embodiments, the pad is a sweatband with dry fit properties. In some embodiments, the pad has holes and is composed In some embodiments, the pad is overmolded onto the suspension frame using a one step, "two shot" injection molding process. In some embodiments, the suspension assembly may be configured to be inserted into or otherwise attached to a helmet or hardhat worn by an individual.

Example Suspension Assemblies

Figure 1:
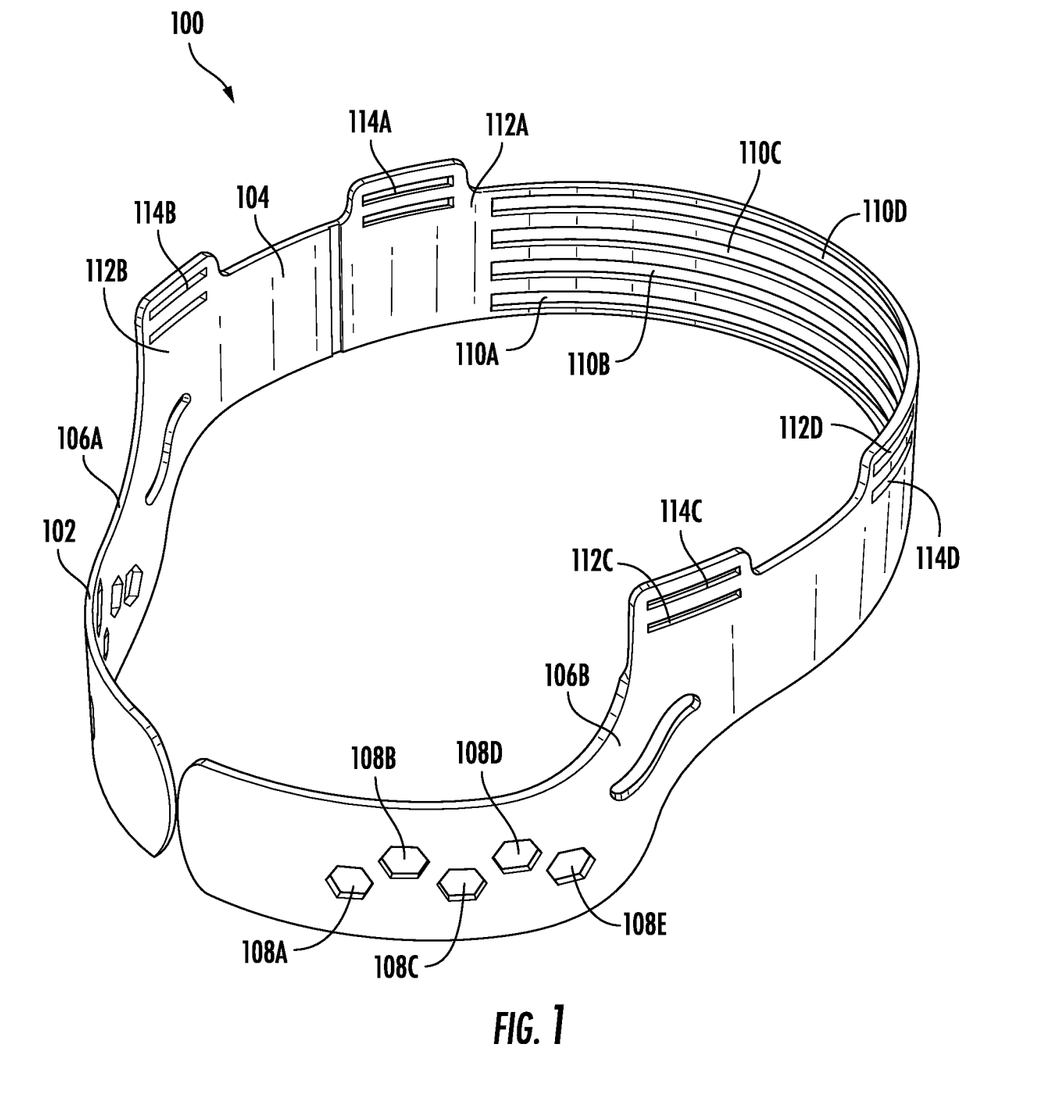
FIG. 1 is an isometric view of an example suspension frame in accordance with various embodiments of the present disclosure.

FIG. 1 shows an isometric view of an example suspension frame 100. In some embodiments, the suspension frame 100 may be a single piece frame configured to be fit around the head of an individual. In some embodiments, the suspension frame 100 may be a single piece when the suspension frame is coupled to a pin lock. In some embodiments, the suspension frame 100 may be multiple pieces when the suspension frame is coupled to a ratchet. In some embodiments, the suspension frame 100 may be configured to be fit inside (or otherwise attached to) a helmet or hard hat. In some embodiments, the suspension frame 100 may have a pad (e.g., a sweatband) 200 overmolded onto the suspension frame 100 to form a suspension assembly 400, as will be describe later in this disclosure.

In some embodiments, the suspension frame 100 may include a lower band 102 and an upper band 104. In some embodiments, the lower band 102 and upper band 104 may be substantially semi-circular bands that form a substantially circular or oval-shaped frame. In some embodiments, the lower and upper bands 102, 104 may be integrated portions of the suspension frame 100, forming a single piece. In some embodiments, the front and upper bands 102, 104 may be configured to conform ergonomically around an individual's head while allowing for breathability and ventilation (e.g., for sweat). In some embodiments, the lower band 102 may be coupled to a ratchet or pin lock.

In some embodiments, the suspension frame 100 may be formed via injection molding. In some embodiments, the suspension frame 100 may be composed substantially of metal, plastic, composites, or some combination of these materials. In some embodiments, the suspension frame 100 may be composed of high-density polyethylene (HDPE) or polyamide 6 (PA6).

In some embodiments, the lower band 102 may include a pair of parallel sloping portions 106A, 106B, which may slope "downward" relative to the upper band 104 such that the lower band 102 is in a "lower" plane than the upper band 104. In some embodiments, the lower band 102 may be configured to fit around front or back of an individual's head when worn. In some embodiments, the lower band 102 may define one or more band holes 108A-D. In some embodiments, the one or more band holes 108A-E may be ventilation holes for a wearer of the suspension frame 100 (e.g., for sweat). In some embodiments, the one or more band holes 108A-E may be substantially hexagonal, or a similar polygonal shape.

In some embodiments, the upper band 104 may include one or more slots 110A-D. In some embodiments, the one or more slots 110A-E may be substantially rectangular shaped and curved to conform to the shape of the upper band 104. In some embodiments, the upper band 104 may be in a "higher" plane than the lower band 102. In some embodiments, the upper band 104 may be configured to fit around the front or the back of an individual's head when worn.

In some embodiments, the suspension frame 100 may include one or more flanges 112A-B. In some embodiments, the one or more flanges 112A-D may be four parallel flanges 112A-D disposed on opposed sides of the suspension frame 100. In some embodiments, the one or more flanges 112A-D may be integrated into the lower band 102 or upper band 104 of the suspension frame 100, forming a single piece. In some embodiments, the one or more flanges 112A-D may be disposed on the suspension frame 100 at the point where the lower band 102 meets the upper band 104. In some embodiments, the one or more flanges 112A-D may include one or more flange connection slots 114A-D. In some embodiments, the one or more flanges 112A-B and the one or more flange connection slots 114A-D may be configured to attach the suspension frame 100 to a helmet or hard hat, as previously alluded to. In some embodiments, the one or more flange connection slots 114A-D may be configured to receive one or more fastening devices or ribbons to attach the suspension frame 100 to a helmet or hardhat.

Figure 2A:
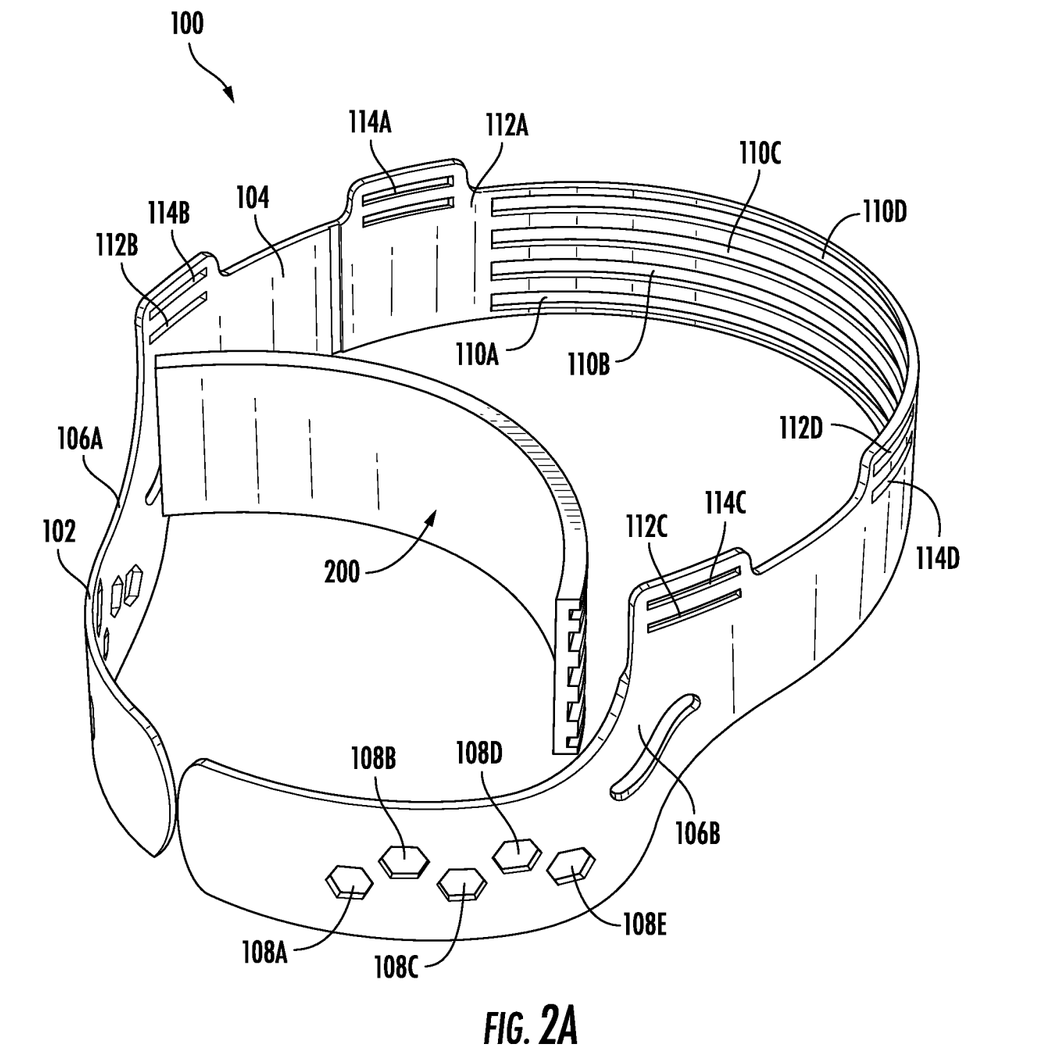
FIG. 2A is an isometric view of an example suspension frame with an overmolded pad in accordance with various embodiments of the present disclosure.
Figure 2B:
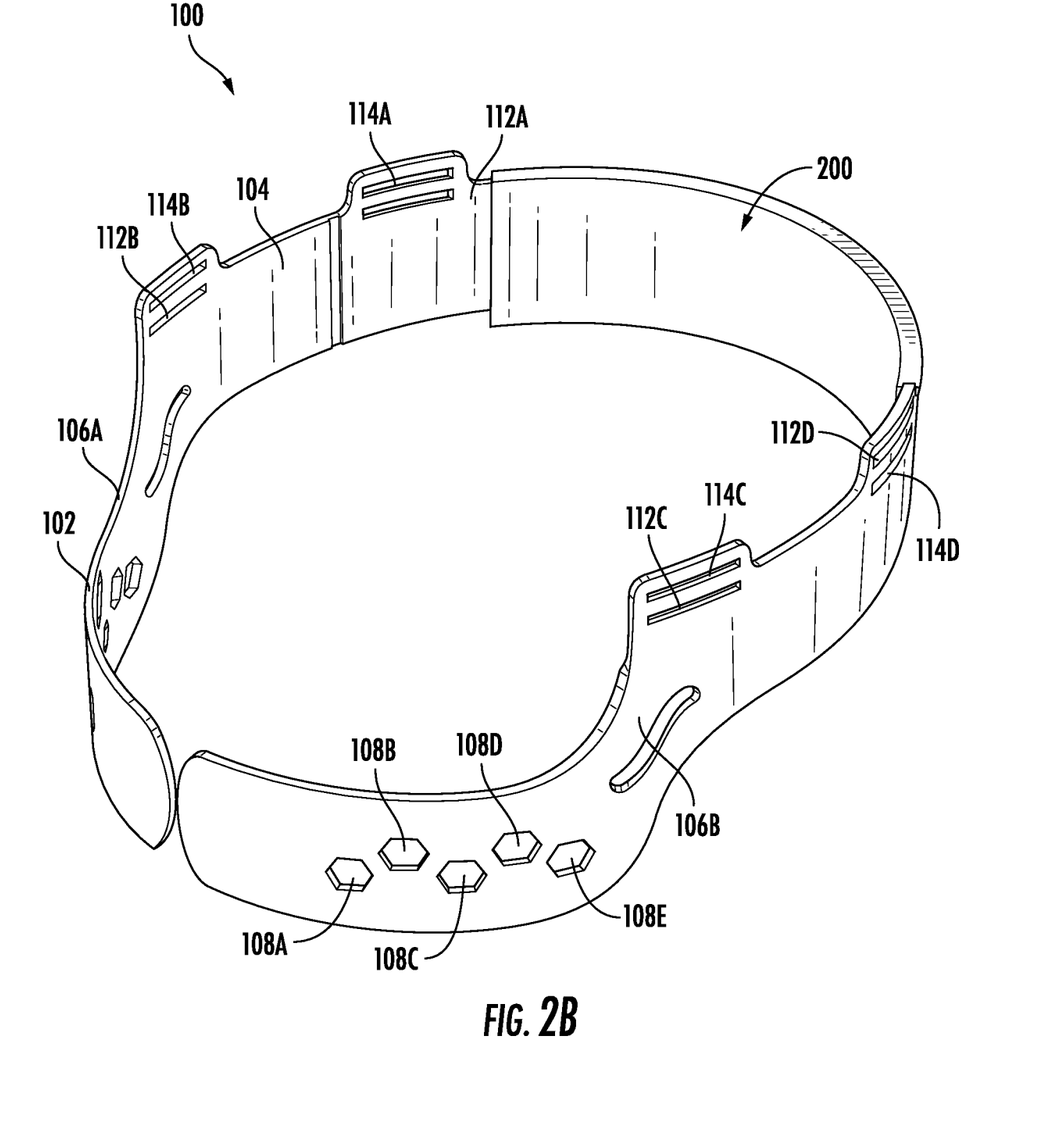
FIG. 2B is an isometric view of an example suspension frame with overmolded pad in accordance with various embodiments of the present disclosure.

FIG. 2A shows an isometric view of an example suspension frame 100 and a pad 200 in the process of being overmolded onto the suspension frame 100. FIG. 2B shows an isometric view of the suspension frame 100 and the pad 200 after the pad 200 has been overmolded onto the suspension frame 100. In some embodiments, the pad 200 may be overmolded onto the upper band 104 of the suspension frame 100. In some embodiments, the pad 200 may be overmolded onto the lower band 102 or both bands, as desired. In some embodiments, and as shown in at least FIG. 2B, the pad 200 may be overmolded to cover the one or more slots 110A-D of the upper band 104. In some embodiments, the pad 200 may be a sweatband with dry fit properties. In some embodiments, the pad 200 may be composed of a thermoplastic elastomer (TPE), thermoplastic vulcanizates (TPV), poly urethane (TPU), or a combination thereof. In some embodiments, the pad 200 may have a hardness ranging between 30 and 50 shore A. In some embodiments, the pad 200 may be overmolded onto the suspension frame 100 in a one step, "two shot" injection overmolding process.

Figure 3:
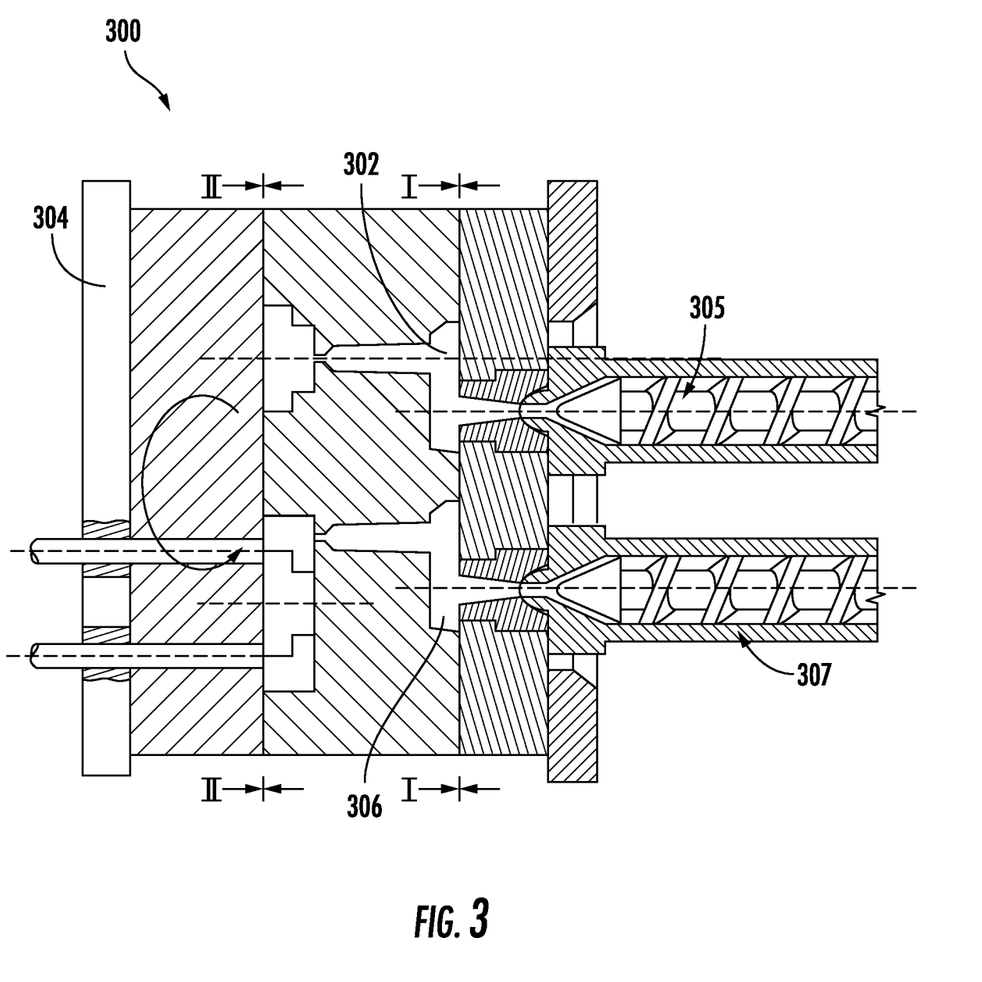
FIG. 3 is a cross-sectional view of an example injection overmolding process in accordance with various embodiments of the present disclosure.

An example of an overmolding process 300 can be seen in at least FIG. 3, according to various embodiments. In some embodiments, the overmolding process 300 may be a one step, "two shot" injection overmolding process. In some embodiments, a first material 302 (e.g., a material of the suspension frame 100) may be injected onto a mold 304. In some embodiments, the first material 302 may be inserted via a first material injection unit 305. In some embodiments, the mold 304 may then be rotated and a second material 306 (e.g., a material of the pad 200) may be injected onto the first material 302. In some embodiments, the second material 306 may be inserted via a second material injection unit 307.

Figure 4A:
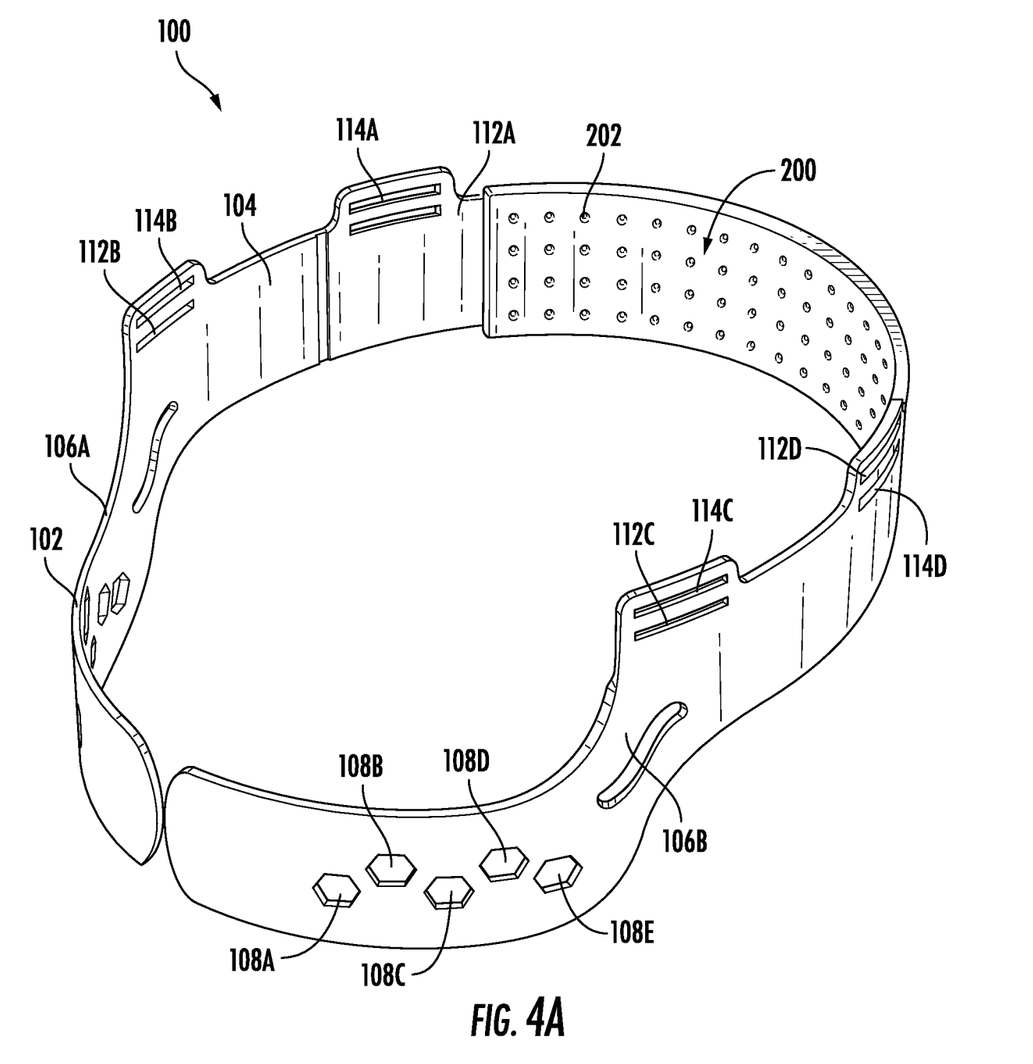
FIG. 4A is a front isometric view of an example suspension assembly in accordance with various embodiments of the present disclosure.
Figure 4B:
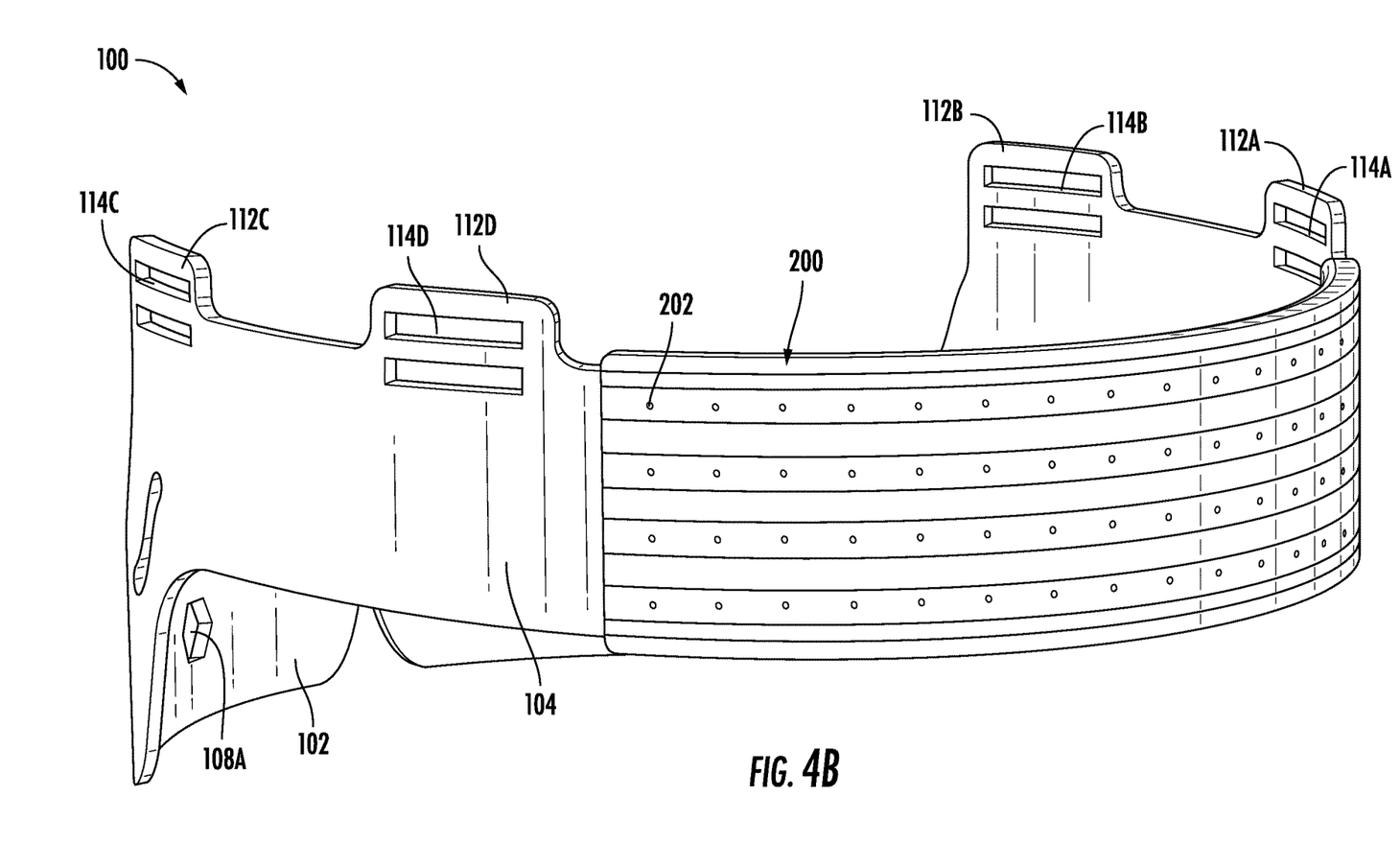
FIG. 4B is a rear isometric view of an example suspension assembly in accordance with various embodiments of the present disclosure.

FIGS. 4A and 4B show a front and rear isometric view of an example suspension assembly 400. In some embodiments, the pad 200 of the suspension assembly may include a plurality of pad holes 202. In some embodiments, the pad holes 202 may be created during the one step, "two shot" injection overmolding process, or the pad holes 202 may be created after the molding process. In some embodiments, the plurality of pad holes 202 may be arranged such that they are disposed over top of the slots 110A-D of the upper band 104. In some embodiments, the pad 200 may cover each slot 110A-D on the upper band 104. In some embodiments, the "hard" material of the upper band 104 may provide mechanical support to the suspension frame 100 (e.g., to hold a helmet or hard hat) while the "soft" material of the pad 200 may provide comfort to a user and allow sweat and other excretions from the user to exit the suspension assembly 400.

Figure 5A:
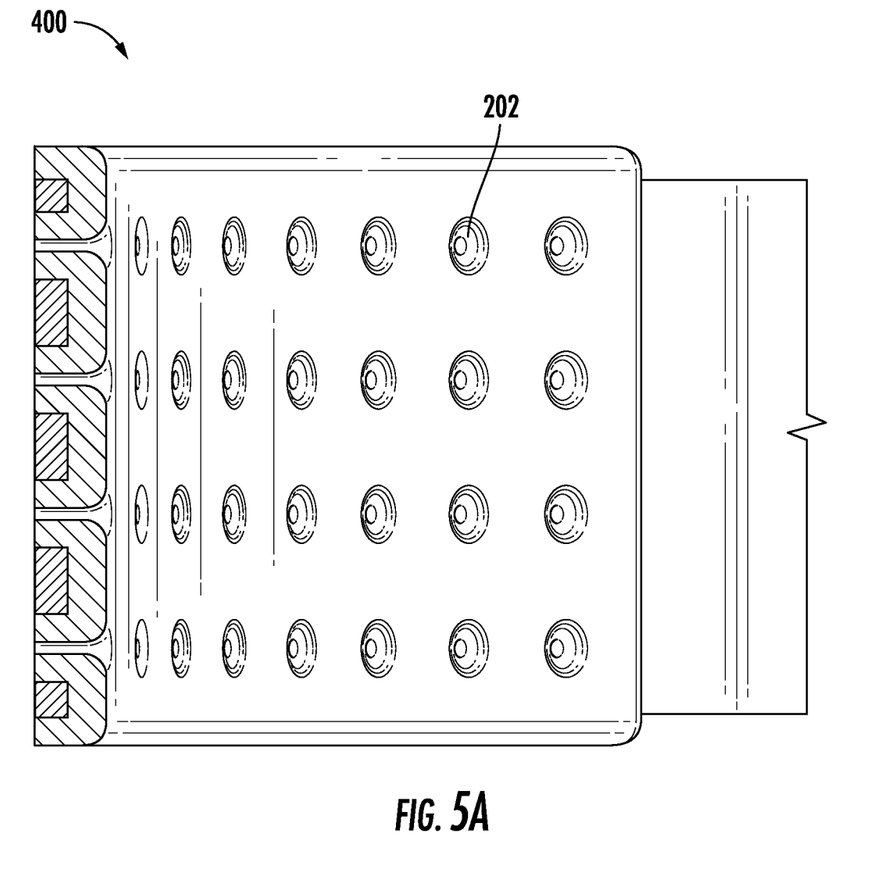
FIG. 5A is a detail view of an example suspension assembly in accordance with various embodiments of the present disclosure.
Figure 5B:
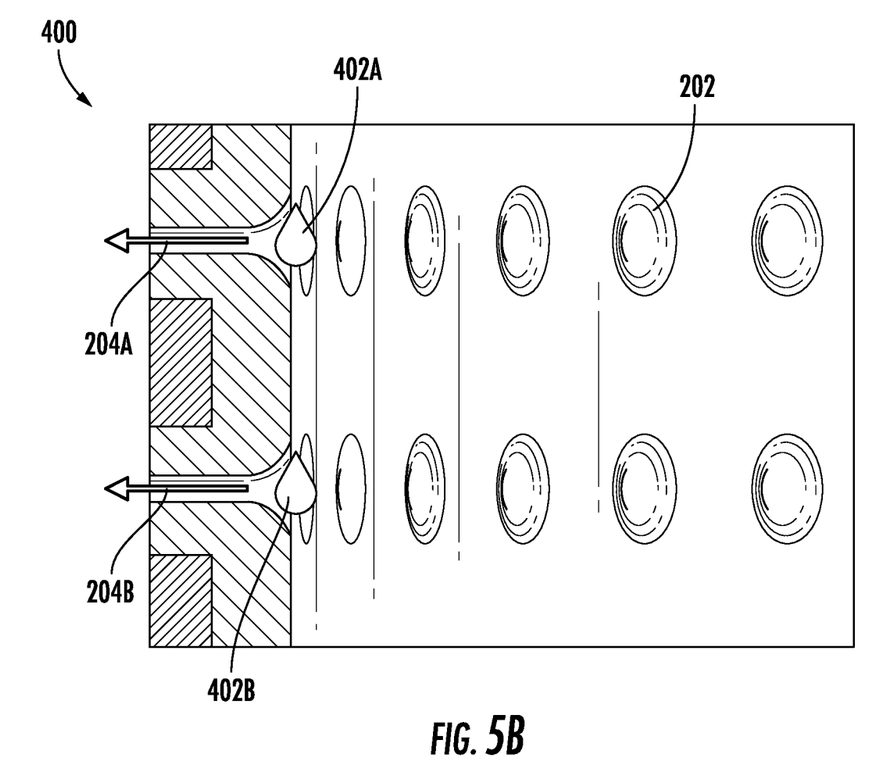
FIG. 5B is a detail view of an example suspension assembly in accordance with various embodiments of the present disclosure.

FIGS. 5A and 5B show detailed views of the suspension assembly 400. In particular the detailed views of FIGS. 5A and 5B show "dry fit" properties of the pad 200 an the pad holes 202. In some embodiments, and as shown in at least FIG. 5B, the material formulation and/or surface finishing of the pad 200 and/or the pad holes 202 may be configured to provide moisture-wicking properties for the suspension assembly 400 (e.g., removal of sweat 402A, 402B). In some embodiments, the pad 200 may be configured to have one or more channels 204A, 204B that may be in fluid communication with the pad holes 202.

Example Methods of Manufacture

Figure 6:
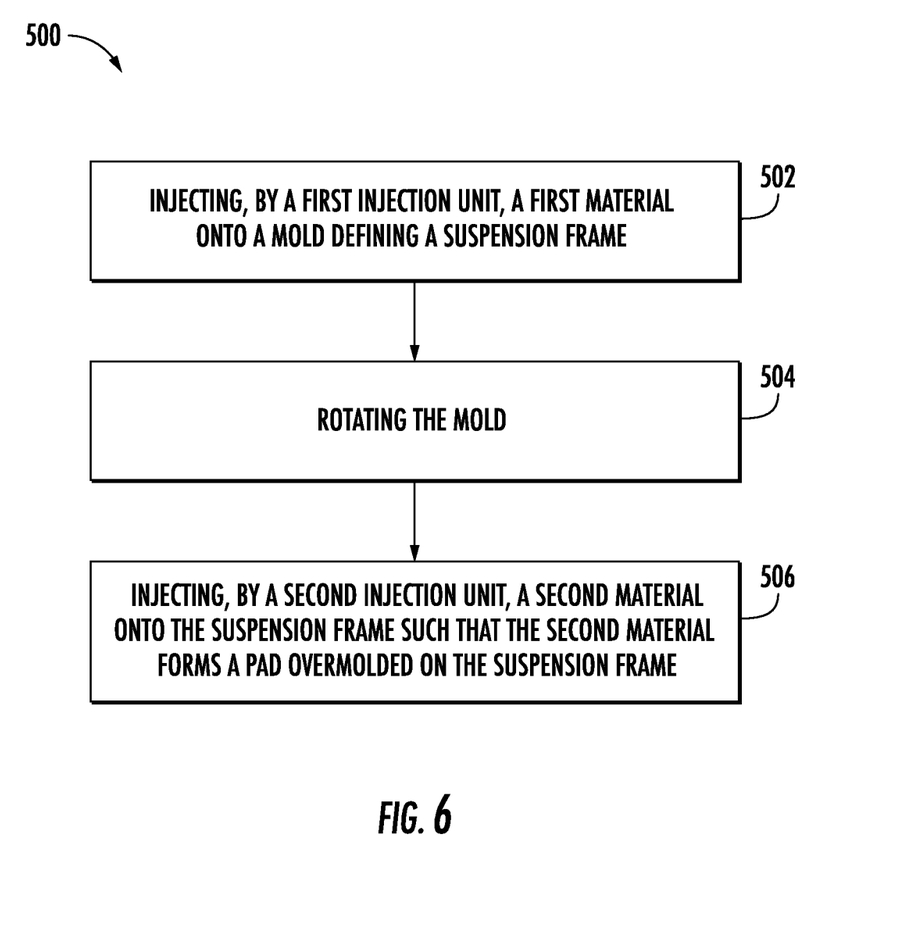
FIG. 6 is a flow chart illustrating an example method of manufacturing an example suspension assembly in accordance with various embodiments of the present disclosure.

FIG. 6 shows a flow chart illustrating an example method 500 for manufacturing a suspension assembly. In some embodiments, the method 500 may be used with respect to the suspension frame 100, pad 200, and suspension assembly 400, and their various components, as previously described. In some embodiments, the method 500 may be used with other suitable systems, assemblies, and components, as desired. In some embodiments, one or more of the steps of the method 500 may be performed sequentially, and in some embodiments one or more of the steps of the method 500 may be performed simultaneously.

In some embodiments, the method 500 may include a first step 502 of injecting, by a first injection unit, a first material onto a mold defining a suspension frame. In some embodiments, the method 500 may include a second step 504 of rotating the mold. In some embodiments, the method 500 may include a third step 506 of injecting, by a second injection unit, a second material onto the suspension frame such that the second material forms a pad overmolded on the suspension frame.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein. they are used in a generic and descriptive sense only and not for purposes of limitation.

The invention claimed is:

1. A suspension assembly comprising:
   a suspension frame comprising:
      a lower band comprising one or more band holes configured to provide ventilation to a wearer of the suspension frame; and
      an upper band comprising one or more slots; and
   a pad overmolded onto the suspension frame,
   wherein the pad comprises one or more pad holes and one or more channels,
   wherein the one or more pad holes are configured to be aligned with the one or more slots such that the one or more pad holes are configured to provide ventilation to the wearer of the suspension frame, and
   wherein the one or more channels are in fluid communication with the one or more pad holes and the one or more pad holes are configured to provide moisture-wicking properties.

2. The suspension assembly of claim 1, wherein the pad is overmolded onto the upper band of the suspension frame.

3. The suspension assembly of claim 1, wherein the suspension frame is a single piece comprising the lower band and the upper band.

4. The suspension assembly of claim 1, wherein the suspension frame comprises one or more flanges comprising one or more flange connection slots, wherein the one or more flange connection slots are configured to receive one or more fasteners to attach the suspension assembly to a helmet.

5. The suspension assembly of claim 1, wherein the suspension frame is composed of high-density polyethylene or polyamide 6.

6. The suspension assembly of claim 1, wherein the pad is a sweatband having moisture-wicking properties and composed of a thermoplastic elastomer (TPE), thermoplastic vulcanizates (TPV), or Thermoplastic Poly Urethane (TPU).

* * * * *